US010369761B2

(12) United States Patent
Mäntylä et al.

(10) Patent No.: US 10,369,761 B2
(45) Date of Patent: Aug. 6, 2019

(54) METHOD AND EQUIPMENT FOR CONTROL AND MANUFACTURE OF CORRUGATED CARDBOARD

(71) Applicant: VALMET AUTOMATION OY, Espoo (FI)

(72) Inventors: Markku Mäntylä, Kangasala (FI); Mikko Lassila, Mutala (FI); Mikko Talonen, Ikaalinen (FI); Kari Söder, Tampere (FI); Marko Toskala, Orivesi (FI)

(73) Assignee: VALMET AUTOMATION OY, Espoo (FI)

( * ) Notice: Subject to any disclaimer, the term of this patent is extended or adjusted under 35 U.S.C. 154(b) by 0 days.

(21) Appl. No.: 15/121,699

(22) PCT Filed: Feb. 26, 2015

(86) PCT No.: PCT/FI2015/050114
§ 371 (c)(1),
(2) Date: Aug. 25, 2016

(87) PCT Pub. No.: WO2015/128545
PCT Pub. Date: Sep. 3, 2015

(65) Prior Publication Data

US 2016/0361888 A1 Dec. 15, 2016

(30) Foreign Application Priority Data

Feb. 28, 2014 (FI) .................................... 20145196

(51) Int. Cl.
*B32B 41/00* (2006.01)
*B31F 1/28* (2006.01)
*D21F 11/12* (2006.01)

(52) U.S. Cl.
CPC .............. *B31F 1/2831* (2013.01); *B31F 1/28* (2013.01); *B31F 1/285* (2013.01); *B31F 1/2845* (2013.01); *D21F 11/12* (2013.01)

(58) Field of Classification Search
CPC .......... B31F 1/2872; B31F 1/28; B31F 1/285; B31F 1/2845
(Continued)

(56) References Cited

U.S. PATENT DOCUMENTS 3,981,758 A 9/1976 Thayer et al.
5,244,518 A 9/1993 Krayenhagen et al.
(Continued)

FOREIGN PATENT DOCUMENTS

CA 2 568 880 A1 6/2007
DE 4307520 A1 9/1994
(Continued)

OTHER PUBLICATIONS

May 29, 2015 International Search Report issued in International Patent Application No. PCT/FI2015/050114.
(Continued)

*Primary Examiner* — Michael N Orlando
*Assistant Examiner* — Joshel Rivera
(74) *Attorney, Agent, or Firm* — Oliff PLC

(57) ABSTRACT

Control equipment for the manufacture of corrugated cardboard. The manufacturing equipment includes a gluing unit, a sensor arrangement and actuator equipment. The actuator equipment is adapted to adjust the moisture on a first surface of a liner on the basis of measurements taken by the sensor arrangement for gluing the liner by its first surface to a fluting paper.

15 Claims, 4 Drawing Sheets

(58) Field of Classification Search
USPC ........................... 156/64, 350, 351, 378, 379
See application file for complete search history.

(56) References Cited

U.S. PATENT DOCUMENTS

| | | | | |
|---|---|---|---|---|
| 5,656,124 | A * | 8/1997 | Krayenhagen .......... | B31F 1/284 156/210 |
| 5,659,976 | A | 8/1997 | Klockenkemper et al. | |
| 6,089,296 | A * | 7/2000 | Hess ..................... | B31F 1/2845 156/462 |
| 2010/0181015 | A1 | 7/2010 | Kohler | |
| 2012/0118474 | A1 | 5/2012 | Casey et al. | |

FOREIGN PATENT DOCUMENTS

| | | | |
|---|---|---|---|
| DE | 29903226 | U1 | 6/1999 |
| JP | 2010-017886 | A | 1/2010 |
| WO | 2004/021048 | A2 | 3/2004 |

OTHER PUBLICATIONS

Feb. 17, 2017 Supplementary Search Report issued in European Patent Application No. 15 75 4740.
Jul. 9, 2018 Office Action issued in European Patent Application No. 15 754 740.7.

* cited by examiner

METHOD AND EQUIPMENT FOR CONTROL AND MANUFACTURE OF CORRUGATED CARDBOARD

FIELD

The invention relates to a method and equipment for control and manufacture of corrugated cardboard.

BACKGROUND

Corrugated cardboard is extensively used as packing material in transport packages, consumer packages, and wrappings. Corrugated cardboard has at least one fluting paper, curved in the form of flutes, and at least one flat surface paper, that is, a liner. Often, one fluting paper is glued between two liners. There may also be several fluted layers in corrugated cardboard in order to improve strength and durability. Typically, starch size is used as the glue, but for humid conditions also wet-strength glue may be used.

It is important for the quality of corrugated cardboard that the gluing holds and the surfaces of the cardboard are undistorted as regards their shape. There are deficiencies in the manufacture of corrugated cardboard, which impairs the quality of corrugated cardboard. Therefore, the need exists to further develop the manufacture of corrugated cardboard.

BRIEF DESCRIPTION

The object of the invention is to realise an improved solution for manufacturing corrugated cardboard.

This is achieved by the control equipment for the manufacture of corrugated cardboard, characterised in that the manufacturing equipment comprising a gluing unit, a sensor arrangement and, as actuator equipment, at least one steam box, which is located between a gluing unit and heating equipment closest to the gluing unit; said at least one steam box being adapted, on the basis of measurements of the sensor arrangement, to adjust temperature and/or amount of steam it is adapted to direct to a liner and the moisture on a first surface of the liner on the basis of measurements taken by the sensor arrangement for gluing the liner by its first surface to a fluting paper.

The invention also relates to a control method for the manufacture of corrugated cardboard, the method comprising: adjusting temperature and/or amount of steam directed to a liner by at least one steam box, which is located between a gluing unit and the heating equipment closest to the gluing unit; and adjusting moisture on a first surface of the liner by the at least one steam box, in order to glue the liner by its first surface to a fluting paper, the temperature and moisture adjustment being based on the measurements of a sensor arrangement.

The invention also relates to the manufacturing method of corrugated cardboard, the method comprising: adjusting temperature and/or amount of steam directed to a liner by at least one steam box, which is located between a gluing unit and the heating equipment closest to the gluing unit, and adjusting moisture on a first surface of the liner by the at least one steam box, in order to glue the liner by its first surface to a fluting paper, the temperature and moisture adjustment being based on the measurements of a sensor arrangement; and gluing, in the gluing unit, a first surface of the liner, the moisture of which the at least one steam box has been adjusting, and a fluting paper to each other.

The invention also relates to a process controller adapted to control the manufacture of corrugated cardboard and comprising at least one processor; and at least one memory containing a computer program code, said at least one memory together with said one processor and the computer program code being adapted to cause the controller to: receive the moisture of a first surface of a liner, measured by a sensor arrangement; and control at least one steam box, which is located between a gluing unit and the heating equipment closest to the gluing unit, adjust temperature and/or amount of steam it is adapted to direct to a liner and the moisture on a first surface of the liner in order to glue the liner by its first surface to a fluting paper, the temperature and moisture adjustment being based on the measurements of a sensor arrangement.

Preferred embodiments of the invention are disclosed in the dependent claims.

The apparatus and method according to the invention provide several advantages. The surface moisture of single-faced corrugated cardboard may be controlled at the processing and gluing stages of the liner and fluting paper, which decreases or removes modal distortions of finished corrugated cardboard and enhances gluing.

LIST OF FIGURES

The invention will now be described in greater detail in connection with preferred embodiments and with reference to the accompanying drawings, in which FIG. 1 shows an example of manufacturing equipment of corrugated cardboard;

DESCRIPTION OF EMBODIMENTS

The following embodiments are presented by way of example. Even though the description may refer to “a”, “one”, or “some” embodiment or embodiments at different points, this does not necessarily mean that each such reference refers to the same embodiment or embodiments or that the feature only applies to one embodiment. Individual features of different embodiments may also be combined to make other embodiments possible.

Figure 1:
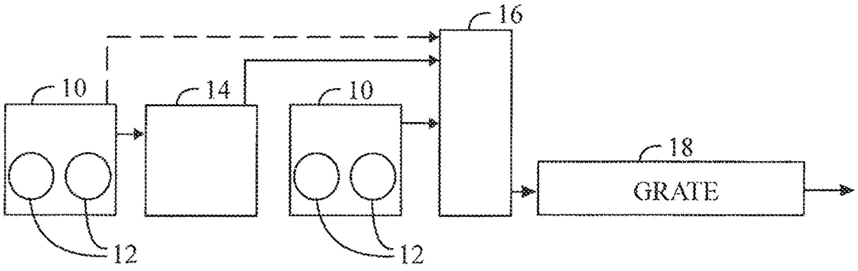

FIG. 1 shows an example of equipment of corrugated cardboard. At the forward end of the process, there is at least one splicer 10 where paper rolls 12 are unwound and fed forward towards the corrugation process and gluing. The paper width is normally approximately 2.5 m. To manufacture fluting paper, the paper is fluted with a singlelacer 14 where the liner, too, is glued to the fluting paper. This is how single-faced corrugated cardboard is manufactured. At a glue machine 16, another liner is glued to the fluting paper of single-faced corrugated cardboard to form double-faced corrugated cardboard. Then, double-faced corrugated cardboard is heated on a grate 18 in order to dry the glue. In a similar manner, multi-faced corrugated cardboard may be formed. As one paper roll 12 is used up, a new paper roll 12 may be brought into use whereby the end of the paper that is about to run out may be glued to the end of the commencing paper. Because the corrugated cardboard machine is used to manufacture batches of a different size of different kinds of corrugated cardboard, the paper roll may be changed every 15 minutes, for example. For the manufacture of double-faced corrugated cardboard, paper is needed from three rolls, which further quickens the need for changing paper rolls in the manufacture of corrugated cardboard.

A plurality of flute profiles may be accomplished for the fluting paper of corrugated cardboard. With the micro flute G&N paper, the thickness, that is, flute height, of corrugated cardboard is approximately 0.8 mm and the wave number approximately 550 waves per meter. With the micro flute F paper, the thickness of corrugated cardboard is approximately 1.0 mm and the wave number approximately 440 waves per meter. With the mini flute E paper, the thickness of corrugated cardboard is approximately 1.5 mm and the wave number approximately 300 waves per meter. With the fine flute E paper, the thickness of corrugated cardboard is approximately 3 mm and the wave number approximately 150 waves per meter. With the coarse flute C paper, the thickness of corrugated cardboard is approximately 4 mm and the wave number approximately 130 waves per meter. With the twin flute BC paper, the thickness of corrugated cardboard is approximately 7 mm.

The fluting paper may be manufactured of primary fibre in a semi-chemical process, for example, and its basis weight may be, for example, 80 g/m$^2$-200 g/m$^2$. Recycled fluting (RF) may, on the other hand, be also produced either in part or entirely of secondary fibre. In corrugated cardboard, liners of three types, for example, may be used: kraftliner, euroliner, and testliner. Kraftliners are manufactured mainly of primary fibre and kraftliners are suitable for food casings. The basis weight may vary from 60 g/m$^2$ to 400 g/m$^2$, or even over 400 g/m$^2$. Euroliners are manufactured of recycled paper. Testliners are mainly manufactured of secondary fibre. Instead of referring to papers when making corrugated cardboard, the reference can also be to paperboard, in other words, to corrugated medium and linerboard.

The quality of the corrugated cardboard as the final product is affected by the quality and characteristics of the papers used. Often, paper rolls are stored in an open storage area where the temperature and moisture are constantly changing. For this reason, the moisture and temperature of the papers on the paper rolls vary according to weather are therefore different from the operating moisture in the papermaking machine. Furthermore, the moisture and temperature of the paper is influenced by whether the paper moisture and temperature are examined on the outermost rings, inner rings, edge, or centre of the roll. In particular at the time a roll is changed, a sudden and fast change in the moisture may take place. The temperature may also undergo an abrupt change. Changes of this kind in the moisture cause the paper and the corrugated cardboard as the final product to warp, in other words, curl, which impedes the manufacture of corrugated cardboard as well as folding and assembling packages out of corrugated cardboard. Temperature, too, may affect the shape of corrugated cardboard to become distorted in the same way.

Figure 2:
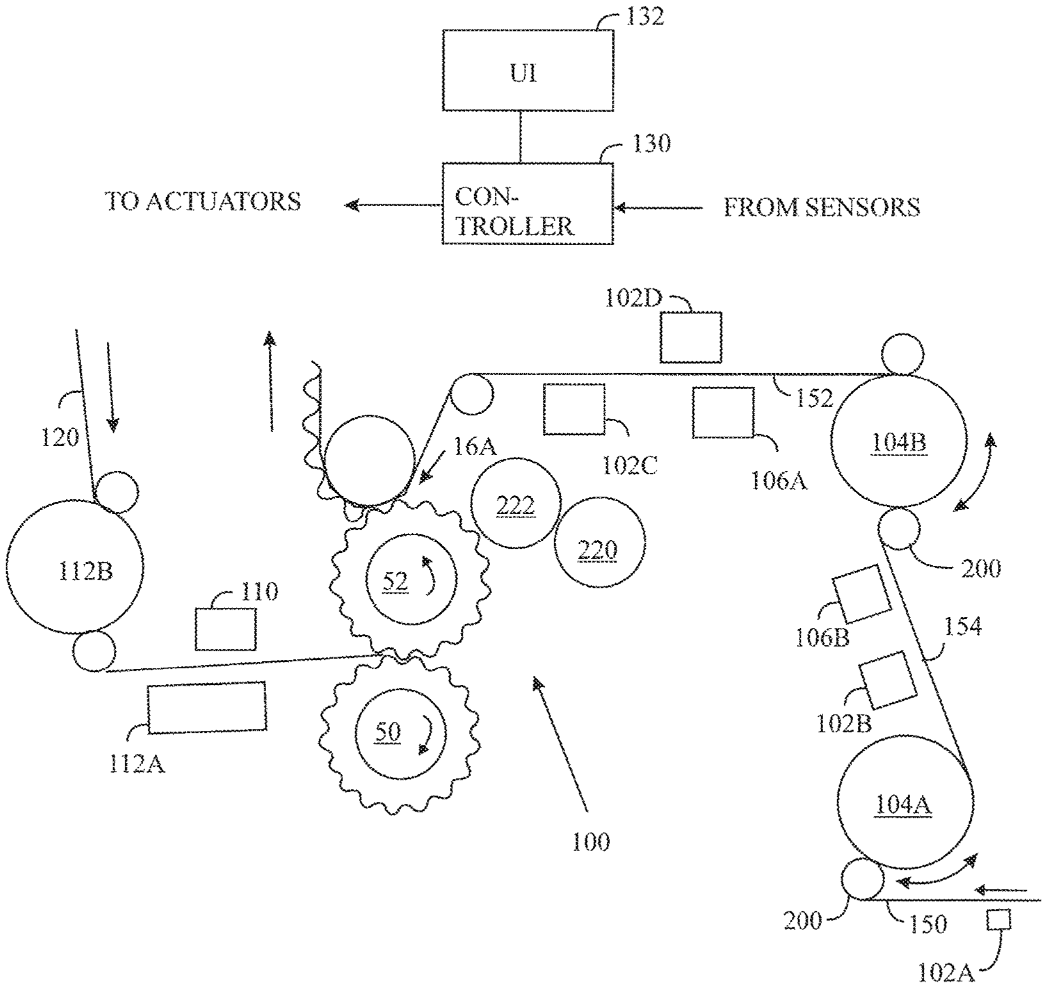
FIG. 2 shows an example of manufacturing equipment of single-faced corrugated cardboard.

FIG. 2 represents the manufacturing equipment of corrugated cardboard, in which single-faced corrugated cardboard in manufactured. So, the equipment of FIG. 2 corresponds to the singlelacer 14 of FIG. 1. Unwound fluting paper 120 arrives at actuators 112A, 112B where the fluting paper 120 is pre-processed for fluting. Then corrugating rolls 50, 52 form corrugated fluting paper 120. After this, the fluting paper 120 proceeds to a gluing unit 16A in which glue is dispensed on the wave crests of fluting paper 120 and fluting paper 120 is glued to the liner 150. The gluing unit 100, sensor arrangement 102A, 102B, 102C, 102D, actuator equipment 104A, 104B, 106A, 106B. In addition, the manufacturing equipment of corrugated cardboard may, in an embodiment, comprise a controller 130 and user interface 132. The controller 130 may comprise at least one processor and one or more memories that contain a computer program code. The computer program code may cause the corrugated cardboard control and/or manufacturing equipment to operate as desired by means of said at least one processor and said one or more memories.

The actuator equipment 104A, 104B, 106A, 106B comprises heating equipment 104A, 104B. The actuator equipment comprises moistening equipment 106A, 106B. The actuator equipment comprises in one embodiment the heating equipment 104A, 104B and the moistening equipment 106A, 106B. The actuator equipment 104A, 104B, 106A, 106B comprises a steam box 106A. By means of the sensor arrangement 102A, 102B, 102C, 102D, at least the surface moisture of the liner 150 is measured. The fluting paper 120 may also be measured by one or more sensors 110. Correspondingly, the moisture and/or temperature of the fluting paper 120 may be adjusted by one or more actuators 112A, 112B. The adjustments may be performed after unwinding before corrugation and gluing.

The at least one steam box 106A acting as the actuator equipment 104A, 104B, 106A, 106B is located between the gluing unit 16A and the heating equipment 104B closest to the gluing unit 16A. Said steam box 106A adjusts the moisture on a first surface 152 of the liner 150 on the basis of measurements taken by the sensor arrangement 102A, 102B, 102C, 102D for gluing the liner 150 by its first surface 152 to the fluting paper 120. The steam box 106A has at this point such benefits that there will not be too much moisture in the liner 150 and not too little, with gluing in mind, but the moisture becomes appropriate. If the liner 150 is moistened too much before gluing, the liner 150 needs to be dried, which may lead to having to decrease the track speed of the liner 150 and heating, which consumes energy and is uneconomical.

The actuator equipment 104A, 104B, 106A, 106B may also in other ways adjust the moisture on the first surface 152 of the liner 150 on the basis of measurements by the sensor arrangement 102A, 102B, 102C, 102D. The gluing unit 100 glues the first surface 152 of the liner 150, the moisture of which the actuator equipment 104A, 104B, 106A, 106B has been adjusting, and the fluting paper 120 to each other. This way, the first surface 152 of the liner 150, to be glued with the fluting paper 120, can be brought to a suitable level of moisture for the glue and gluing. In such a case, there will be enough glue to establish a strong contact, but adequately little so as to avoid the penetration of the glue through the liner 150. Once the moisture on the first, to be glued surface 152 of the liner 150 has been optimized, the gluing will succeed well and the shape of corrugated cardboard will not become deformed.

On the other hand, the glue can be made go through the liner 150 and the corrugated cardboard made to warp, if the moisture of the first surface of the liner 150 is adjusted to be so high that the moisture is in the thickness direction high through the liner 150.

In an embodiment, the actuator equipment 104A, 104B, 106A, 106B may adjust the temperature on a second surface 154 of the liner 150, which is on the opposite side to the first surface 152 on the liner 150, on the basis of measurements by the sensor arrangement 102A, 102B, 102C, 102D. When the second surface 154 of the liner is heated, the moisture will transfer to the first surface 152 of the liner 150, which facilitates gluing, and the second surface of the liner 150 will dry. In such a case, a large moisture gradient is created on the liner 150. Glue cannot pass through the liner 150, because glue will not penetrate the dry part of the liner 150 to the second surface 154, but the second surface 154 will remain dry.

Figure 3:
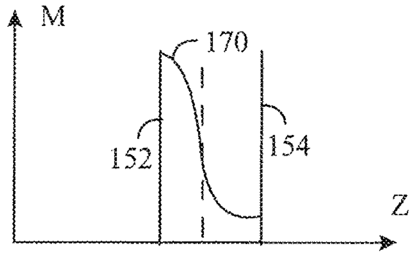
FIG. 3 shows an example of moisture distribution in the thickness direction of a liner.

Graph 170 in FIG. 3 represents the moisture M of the liner 150 in the thickness direction Z of the liner 150 on a freely chosen scale. The dotted line represents an example of the desired penetration depth of glue into the liner 150. Glue is able to proceed in the thickness direction of the liner 150 for as long as the liner 150 is moist. Glue cannot, however, penetrate into the dry part of the liner 150. This way, glue adheres well to the moist, first side 152 of the liner 150 but does not penetrate the liner 150. Consequently, there will not be colour or shape variations on the outer surface 154 of the liner 150. This improves, for example, the printability, ability to cut and print on the corrugated cardboard, and ease of assembly of enclosures.

Figure 4:
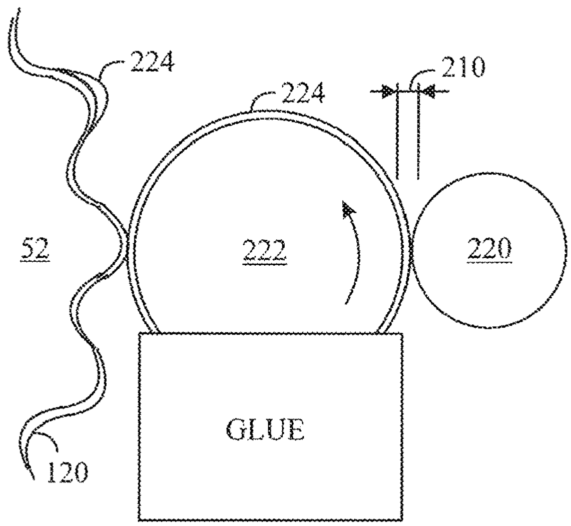
FIG. 4 shows an example of a gluing gap.

In an embodiment, shown in FIG. 4, the gluing unit 100 comprises a gluing gap 210 between a roll doctor 220 and a distributor roll 222. The distributor roll 222 rotates in the glue, whereby a layer of glue 224 sticks on its surface. The gluing gap 210 may be adjusted on the basis of measurements by the sensor arrangement 102A, 102B, 102C, 102D. The gluing gap 210 forms a layer on the distributor roll 222 from the glue 224, so therefore the gluing gap 210 regulates the amount of glue in the gluing of the liner 150 and fluting paper 120. Glue 224 may be distributed from the gluing gap 210 on the gluing unit 100 on the wave crests of the fluting paper 120. The wave crests of the fluting paper 210 usually touch glue 224, only, but not the distributor roll 222. Glue 224 may be dispensed, for example, approximately 5 $g/m^2$-20 $g/m^2$. The glue temperature as it is being distributed may be approximately 50° C.-70° C., for example, corresponding to the gelatinization temperature of glue.

In an embodiment, the gluing unit 100 is adapted to adjust the content of the glue components on the basis of measurements taken by the sensor arrangement 102A, 102B, 102C, 102D. Glue may consist of dry matter and liquid. In such a case, the mutual ratio of dry matter and liquid may be changed on the basis of measurements taken by the sensor arrangement 102A, 1026, 102C, 102D. If, for example, the moisture content of the liner 150 is high, the dry matter content of the glue may be increased. So, the dry matter content may be increased if the moisture content of the liner 150 increases.

In an embodiment, the gluing unit 100 comprises a glue dispenser, which is adjusted on the basis of measurements taken by the sensor arrangement 102A, 102B, 102C, 102D, and which regulates the amount of glue for the gluing of the liner 150 and fluting paper 120.

Figure 5:
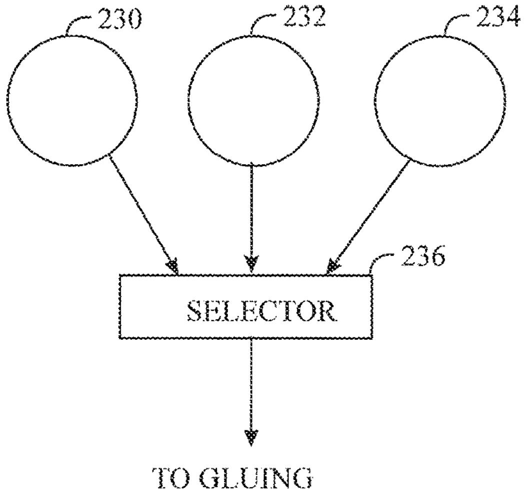
FIG. 5 shows an example of dosing different glue types.

In an embodiment, shown in FIG. 5, the gluing unit 100 has glue of different types, and the gluing unit 100 selects the type of glue on the basis of measurements taken by the sensor arrangement 102A, 102B, 102C, 102D. The different glue types may be in different containers 230, 232, 234, from which the selector 236 of the gluing unit 100 selects the type of glue. In an embodiment, the glue types may have different flowing characteristics. In an embodiment, the type of glue is determined according to the quantity of water. The more water there is, the more running the glue is. In an embodiment, the glue types may have different moisture-resistance characteristics. In an embodiment, the glues types may include a starch-based glue and wet-strength glue. In an embodiment, the glue types may have different penetration characteristics, whereby they penetrate the liner 150 into different depths. In an embodiment, the moister the liner 150 is, the less penetrating may the selected glue type be. For example, out of starch-based glues, potato starch based glue penetrates the liner 150 to a lesser extent than corn starch based glue. Other glue types include glues that are based on grain, such as wheat, for example. In an embodiment, the types of glue vary according to viscosity, content of dry material, and gelatinization temperature.

The fluting paper 120 and liner 150 to be glued to each other in the gluing unit 100 are heated whereby the glue is gelatinized. In gelatinization, the starch particles are dissolved in water. Additives may be added in the different types of glue, and by means of their effects the gelatinization temperature may be changed. The additive may be a polymer, for example. Often, the gelatinization temperature is approximately 60° C.-80° C.

In an embodiment, the sensor arrangement 102A, 102B, 102C, 102D is used to carry out the moisture measurement of the liner 150 in the direction of motion of the liner 150 before the actuator 104A, 104B, 106A, 106B and after the actuator 104A, 104B, 106A, 106B. This way, by the actuator 104A, 104B, 106A, 106B, the control of the moisture of the liner 150, and possibly also of temperature, may be changed fast.

In an embodiment, the heating equipment 104B is located in the direction of motion of the liner 150 just before the gluing unit 100. This way, the heating effect has no chance to change by the time gluing starts.

In an embodiment, the moistening equipment 106A is located in the direction of motion of the liner 150 just before the gluing unit 100. This way, the moistening effect has no chance to change by the time gluing starts.

In an embodiment, the sensor arrangement 102A, 102B, 102C, 102D measures the moisture optically. In an embodiment, the sensor arrangement 102A, 102B, 102C, 102D measures the liner 150 on one or more wavelengths, where water has a higher absorption than the wavelengths in the environment. In an embodiment, the absorption wavelength of water may be, for example, approximately 1.4 µm, 1.9 µm and/or 2.7 µm. In an embodiment, the moisture measurement is performed of the liner 150 as a reflectometer measurement. The penetration depth of the optical radiation in an optical reflection measurement into the liner 150 may correspond to a part of the thickness of the liner 150, whereby optical measurement may be used to measure the surface moisture of the liner 150. The intensity and wavelength of optical radiation may be adapted to the liner properties in such a manner that the measurement of the surface moisture is successful. The adaptation may be based on theory, simulation, or experimentation.

In an embodiment, moisture is measured as relative moisture in relation to cellulose or the basis weight of the liner 150. This way, the moisture information may be obtained as a percentage of moisture, for example. Furthermore, the sensor arrangement 102A, 102B, 102C, 102D allows the measurement of cellulose content, for example, in the liner 150.

In an embodiment, in addition to the surface moisture, also the total moisture of the liner 150 may be measured. In an embodiment, the moisture measurement is performed of the liner 150 as a through measurement.

In an embodiment, moisture measurement may be used to define the moisture distribution and/or gradient of the liner 150 in its thickness direction. The definition of the moisture distribution and/or gradient may be accomplished by measuring the surface moisture on both sides of the liner 150. The definition of the moisture distribution and/or gradient may be accomplished by measuring the surface moisture on at least one side of the liner 150 and the total moisture of the liner 150.

The heating equipment 104A, 104B adjusts the liner 150 temperature on the basis of measurements by the sensor arrangement 102A, 102B, 102C, 102D. The heating equipment 104A, 104B may heat the liner 150 on the side of at least one surface 152,154 in order to equalize the moisture in the making direction of the liner 150. If the moisture is high, it may be reduced by the heating equipment 104A, 104B.

In addition, the moistening equipment 106A, 106B adjusts the liner 150 moisture on the basis of measurements by the sensor arrangement 102A, 102B, 102C, 102D. The moistening equipment 106A, 106B may moisten the liner 150 on the side of at least one surface 152,154 in order to equalize the moisture in the making direction of the liner 150. If the moisture is low, it may be increased by the heating equipment 104A, 104B.

Similarly, for moisture adjustment of the fluting paper 120, a steam box or another moistener, for example, may be used as the actuator 112A. To adjust the temperature, a steam cylinder with an adjustable angle of contact or another heating device, for example, may be used as the actuator 112B.

The gluing unit 100 glues the liner 150, whose moisture and/or moisture has been adjusted, and the fluting paper 120 to each other.

In an embodiment, the heating equipment 104A, 104B comprises at least one drying cylinder, as shown by the heating equipment of FIG. 2. In such a case, the temperature adjustment of the liner 150 is performed by changing the angle of contact of the drying cylinder on the basis of measurements by the sensor arrangement 102A, 102B, 102C, 102D. A change in the angle of contact may be carried out by moving a roll 200 whereby the area of the liner 150 against the drying cylinder increases or becomes larger (curved arrow next to the heating devices 104A and 104B). The longer the angle of contact is, the more the drying cylinder heats the liner 150. The heat of the drying cylinder comes from hot steam, contained by the drying cylinder.

In an embodiment, the heating equipment 104A, 104B comprises an infrared heater (not shown in the Figures), which adjusts its heating power on the basis of measurements by the sensor arrangement 102A, 102B, 102C, 102D.

In an embodiment, the heating equipment 104A, 104B comprises an induction heater (not shown in the Figures), which adjusts its heating power on the basis of measurements by the sensor arrangement 102A, 102B, 102C, 102D.

In an embodiment, said moistening equipment 106A, 106B comprises a steam box (not shown in the Figures), which adjusts the amount of steam it focuses on the liner 150. In an embodiment, the steam box adjusts the temperature of the steam it directs to the liner 150. When a steam box is used, energy-optimization may be achieved.

In an embodiment, the moistening equipment 106A, 106B comprises a set of water nozzles (not shown in the Figures), which adjusts the amount of the water spray it directs to the liner 150. In an embodiment, the set of water nozzles comprises a temperature adjustment part (not shown in the Figures), which adjusts the temperature of the water spray it directs to the liner 150.

In an embodiment, the sensor arrangement 102A, 102B, 102C, 102D also measures the temperature of the liner 150. In such a case, the heating equipment 104A, 104B adjusts the liner 150 temperature based on the surface moisture measurement and temperature. Correspondingly, the moistening equipment 106A, 106B may adjust the liner 150 moisture based on the surface moisture measurement and temperature.

Figure 6A:
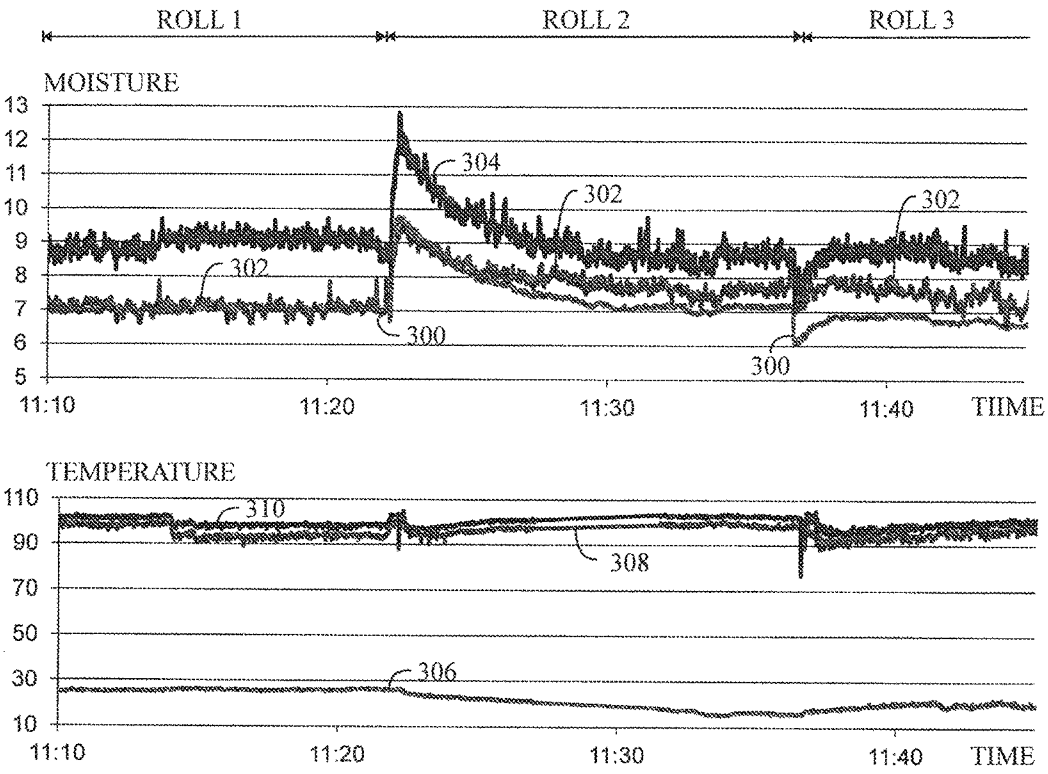
FIG. 6A shows an example of uncontrolled behaviour of moisture in the manufacturing equipment of single-faced corrugated cardboard.

FIG. 6A shows the change in moisture and temperature as a function of time at a time three different paper rolls 12 change in the manufacture of corrugated cardboard. Moisture is shown as percentages, and time as hours and minutes. Temperature is shown in degrees Celcius, and time as hours and minutes on the same scale as moisture, because temperature and moisture were measured at the same time. Graph 300 shows the moisture of an unwound paper roll. Graph 302 shows the surface moisture of the liner 150 on a first surface 152, which will be glued to the fluting paper 120. Graph 304 shows the surface moisture of the liner 150 on a second surface 154, which may be the glueless outer surface of the corrugated cardboard.

Graph 306 shows the temperature of an unwound paper roll. Graph 308 shows the surface moisture of the liner 150 on a first surface 152, which will be glued to the fluting paper 120. Graph 310 shows the surface moisture of the liner 150 on a second surface 154, which may be the glueless outer surface of the corrugated cardboard. Graphs show that when the paper roll changes from roll 1 to roll 2, the temperature temporarily rises to some extent, whereas when changing from roll 2 to roll 3 the temperature decreases to some extent. If the moisture of the liner 150 were adjusted on the basis of temperature alone, the heating of the liner 150 would be reduced due to a rise in the temperature. This adjustment would, however, go in the wrong direction because according to the moisture measurement the liner 150 from the roll 2 is much moister than the liner 150 from the roll 1. Therefore, even though the temperature of the liner 150 increases as the roll is changed, the liner 150 must in fact be heated more in order to remedy the surface moisture and/or total moisture. Correspondingly, when transferring from roll 2 to roll 3, based on temperature, heating would be increased even though according to the surface moisture measurement heating should be reduced. FIG. 6A further shows that moisture measurements on the different surfaces 152, 154 of the liner 150 may reveal a difference in the moisture of the surfaces, which is indicative of moisture distribution in the thickness direction of the liner. By means of the moisture distribution and/or moisture gradient, the moisture on the different surfaces of the liner 150 and/or the total moisture may be adjusted, whereby gluing is easier to perform.

Temperature and surface moisture changes also take place within one paper roll. In such a case, too, the surface moisture of the liner 150 may be changed by means of measuring the surface moisture.

Based on FIG. 6A, it is possible to conclude that the conditioning of the liner temperature it is not essential from the point of view of adjusting the surface moisture, but temperature variations may be allowed. Then, the total moisture and/or surface moisture of the liner 150 may be adjusted more efficiently.

Figure 6B:
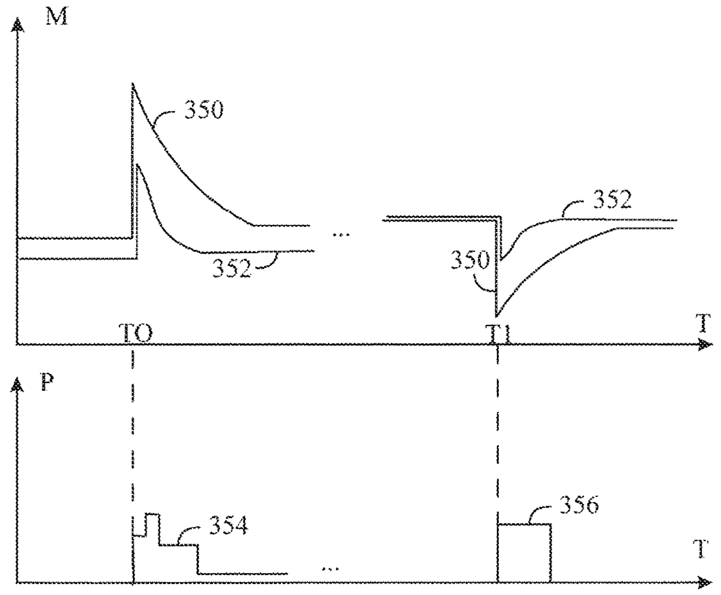
FIG. 6B shows an example of controlled and uncontrolled behaviour of moisture in the manufacturing equipment of single-faced corrugated cardboard.

FIG. 6B represents the measured moisture M of the liner 150 as a function of time T on a freely-chosen scale and the operating power P of the actuator as a function of time T on a freely-chosen scale. Moisture M may refer to the surface moisture of the liner 150 on a first surface 152, which will be glued to the fluting paper 120. The measurement may have been carried out by a sensor arrangement 102A, 102B, 102C, 102D. In this case, the viewpoint may be taken that the measurement was carried out by the sensor arrangement 102B or 102C. In the case of graph 300, the liner 150 is not moistened or heated. In the case of graph 302, the liner 150 is moistened and heated. The moisture of the liner 150 is relatively even to begin with. At T0, a liner roll change takes place, and the moisture of the liner on the second roll is notably higher, at first in particular, than that of the liner on the previous roll. After a while, the moisture of the second liner becomes even but remains slightly different in this example from the moisture of the first roll. At T1, a new liner change takes place. Here, the moisture of the third liner at first is notably lower than that of the second liner. In this case, too, the moisture becomes even after a while.

Graph 302 represents the corresponding moisture measurement, but in this case the heater 104A, 104B is switched on or its power is increased at T0 as per graph 304. The increase in the heating power may also take place just before T0, whereby the change in moisture is just about to arrive in the gluing unit 100, or slightly after T0 whereby the change in moisture is still large and affects the manufacture of corrugated cardboard. The heating power may be increased and decreased during the change in the heating power. As shown by graph 302, even though the change in moisture is not in the case of graph 302 quite as high as in the case of graph 300, the duration of the moisture change may be made shorter by heating. Correspondingly, if heating is started even before a change in moisture, the intensity of the moisture change may be decreased. On the other hand, it is also possible to increase the rise in moisture and/or extend the duration of the moisture change by a reduction in heating.

In the case according to graph 302, at T1 the moistening of the liner may be increased according to graph 306, whereby the change in the moisture of the third liner is of shorter duration than in the unmoistened case according to graph 300. Moistening may be increased and decreased step-by-step in the same way as heating. The increase in the moistening may take place just before T1, whereby the change in moisture is just about to arrive in the gluing unit 100, or slightly after T1 whereby the change in the moisture of the liner is still large and affects the manufacture of corrugated cardboard.

In an embodiment, the sensor arrangement 102A, 1026, 102C, 102D may be used to measure the porosity H, thickness P, smoothness S, and/or coarseness Ka of the liner 150. With the aid of these measurements, the actuator arrangement 104A, 104B, 106A, 106B may adjust the moisture of the first surface 152 and/or the second surface 154 of the liner 150. For example, when the thickness of the liner 150 increases, moistening may be increased. The amount A of the needed moisture for the adjustment procedure may be determined by the function A=f(K1, K2, Ko, L1, L2, H, P, S, Ka), where K1 is the moisture of the first surface, K2 is the moisture of the second surface, Ko is the total moisture, L1 is the moisture of the first surface, L2 is the moisture of the second surface, and f is a linear or non-linear function.

Figure 7:
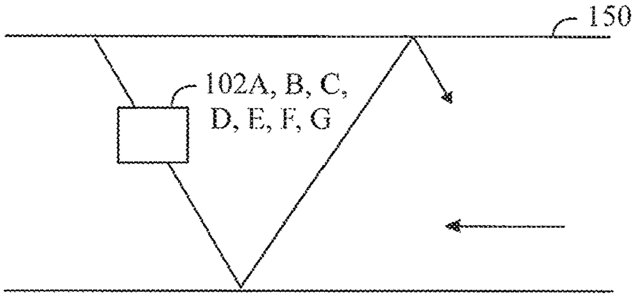
FIG. 7 shows an example of sweeping measurement.
Figure 8:
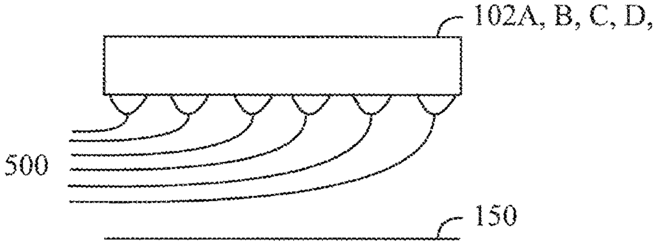
FIG. 8 shows an example of row measurement.

In an embodiment, the surface moisture of the liner 150 may be measured by the sensor arrangement 102A, 1026, 102C, 102D, in addition to the making direction, also in the transverse direction. In such a case, the surface moisture of each transverse point or sector of the liner 150 may be separately measured and adjusted. In an embodiment, shown in FIG. 7, the sensor arrangement 102A, 102B, 102C, 102D may sweep across the liner 150. In an embodiment, shown in FIG. 8, the sensor arrangement 102A, 102B, 102C, 102D comprises a row of sensors 500, which is aligned over the liner 150 in the transverse direction. This allows the moisture and/or temperature to be measured.

In an embodiment, the surface moisture of the liner 150 may be adjusted by moistening equipment 106A, 106B, in addition to the making direction, also in the transverse direction. Often, the penetration of glue is worse at the edges of the liner 150 than in the middle. In such a case, the surface moisture at the edges of the liner 150 may be increased by moistening and/or heating. In an embodiment, the moistening equipment 106A, 106B may sweep over the liner 150 in the same way as the sensor arrangement 102A, 102B, 102C, 102D in FIG. 7. In an embodiment, the moistening equipment 106A, 106B comprises a row of sensors in the same way as the sensor arrangement 102A, 1026, 102C, 102D in FIG. 8, which is aligned over the liner 150 in the transverse direction.

In an embodiment, the surface moisture of the liner 150 may be adjusted by the heating equipment 104A, 104B, in addition to the making direction, also in the transverse direction. In an embodiment, the heating equipment 104A, 104B may sweep over the liner 150 in the same way as the sensor arrangement 102A, 102B, 102C, 102D in FIG. 7. In an embodiment, the heating equipment 104A, 104B comprises a row of sensors in the same way as the sensor arrangement 102A, 102B, 102C, 102D in FIG. 8, which is aligned over the liner 150 in the transverse direction.

In an embodiment, the surface temperature of the liner 150 may be adjusted by the heating equipment 104A, 104B, in addition to the making direction, also in the transverse direction. In such a case, heating is directed on the liner 150 in a zone-by-zone manner by line-form heating in the same way as the measurements by the sensor arrangement in FIG. 5.

As the liner 150 is processed as regards moisture and temperature, it is possible to influence the warping of corrugated cardboard as early as its manufacturing stage, whereby the end product will be as desired. This is additionally affected by adjusting the amount, quality, and type of glue. In such a case, the liner 150 may be straightened or curved by increasing or decreasing moisture on one or both surfaces of the liner 150. By adjusting the amount of moisture on the surfaces of the liner 150, the liner 150 may be curved or straightened to the extent desired. Fluting paper 120 may be processed similarly.

Figure 9:
FIG. 9 shows an example of a processor and memory.

FIG. 9 shows an example of a controller 130. The controller 130 may comprise at least one processor 600 and at least one memory 602 that contains a computer program code. Said at least one memory 602 together with said at least one processor and computer program code causes the controller 130 to receive the surface moisture of the liner 150, measured by the sensor arrangement 102A, 102B, 102C, 102D, and to control the actuator equipment 104A, 104B, 106A, 106B to adjust the moisture of the liner 150.

Figure 10:
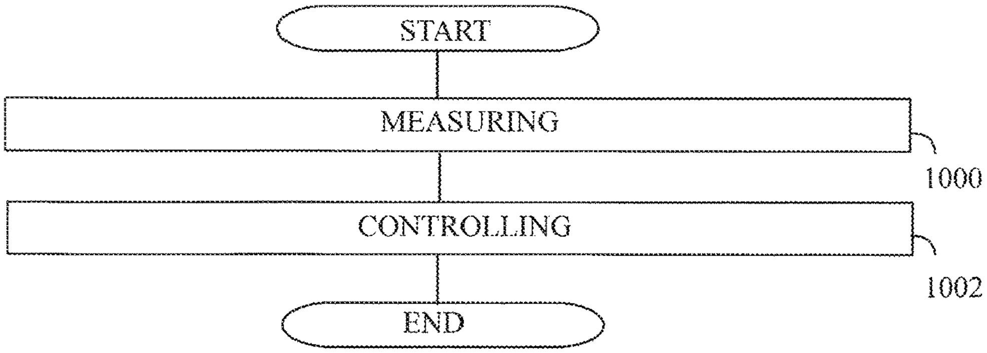
FIG. 10 shows a model flow chart of the method.

FIG. 10 is a flow chart of the adjustment method. At step 1000, measuring takes place, and at 1002 adjusting takes place.

The method shown in FIG. 10 may be implemented as a logic circuit solution or computer program. The computer program may be placed on a computer program distribution means for the distribution thereof. The computer program distribution means is readable with a data processing device, and it may encode the computer program commands to control the operation of the measuring device.

The distribution means, in turn, may be a solution known per se for distributing a computer program, for instance a data processor-readable medium, a program storage medium, a data processor-readable memory, a data processor-readable software distribution package, or a data processor-readable compressed software package. In some cases, the distribution medium may also be a data processor-readable signal, or a data processor-readable telecommunications signal.

Even though the invention has been described above with reference to the examples according to the attached drawings, it is clear that the invention is not restricted thereto but may be modified in many ways within the scope of the accompanying claims.

The invention claimed is:

1. An apparatus for the manufacture of corrugated cardboard, the apparatus comprising:

a gluing unit;

heating equipment adjacent to the gluing unit;

a first sensor arrangement disposed around a liner and being configured to measure a moisture of a first surface of the liner, the first surface of the liner being glued to a fluting paper;

a second sensor arrangement disposed around the liner and being configured to measure a temperature of the liner; and at least one steam box disposed between the gluing unit and the heating equipment, the at least one steam box being configured to control the temperature and moisture of the liner by adjusting an amount of steam directed at the liner in response to the measured moisture and the measured temperature of the liner by the first and second sensor arrangements, wherein the moisture of the liner may be decreased or increased by the at least one steam box.

2. The apparatus as claimed in claim 1, further comprising:

actuator equipment configured to control a temperature on a second surface of the liner, which is on an opposite side to the first surface of the liner, based on measurements taken by the second sensor arrangement.

3. The apparatus as claimed in claim 1, wherein the gluing unit comprises a glue gap which is adjusted based on measurements taken by the first or second sensor arrangement and which is adapted to dispense an amount of glue in the gluing of the liner and fluting paper.

4. The apparatus as claimed in claim 1, wherein the gluing unit is adapted to adjust a content of glue components based on measurements taken by the first or second sensor arrangement.

5. The apparatus as claimed in claim 1, further comprising:

a set of water nozzles configured to adjust an amount of water spray it directs to the liner.

6. The apparatus as claimed in claim 1, further comprising:

actuator equipment configured to adjust the temperature and moisture of the liner based on the surface moisture measurement and temperature measurement.

7. A method for the manufacture of corrugated cardboard, the method comprising:

measuring a moisture of a first surface of a liner by a first sensor arrangement disposed around the liner, the first surface of the liner being glued to a fluting paper;

measuring a temperature of the liner by a second sensor arrangement disposed around the liner; and controlling the temperature and moisture of the liner by adjusting an amount of steam directed at the liner, by at least one steam box disposed between a gluing unit and a heating equipment, in response to the measured moisture and the measured temperature of the liner by the first and second sensor arrangements, wherein the moisture of the liner may be decreased or increased by the at least one steam box.

8. The method as claimed in claim 7, further comprising:

using actuator equipment to adjust temperature on a second surface of the liner, which is on an opposite side to the first surface of the liner, based on measurements taken by the second sensor arrangement.

9. The method as claimed in claim 7, further comprising:

adjusting a glue gap of a gluing unit based on measurements taken by the first or second sensor arrangement and an amount of glue is dispensed by the glue gap in the gluing of the liner and fluting paper.

10. The method as claimed in claim 7, further comprising:

adjusting a content of glue components based on measurements taken by the first or second sensor arrangement.

11. The method as claimed in claim 7, further comprising:

adjusting heating power of at least one drying cylinder based on measurements taken by the first or second sensor arrangement.

12. The method as claimed in claim 7, further comprising:

adjusting an amount of water spray steam that a set of water nozzles directs to the liner based on measurements taken by the first or second sensor arrangement.

13. The method as claimed in claim 7, further comprising:

adjusting the temperature and moisture of the liner by actuator equipment, based on the surface moisture measurement and temperature measurement.

14. A manufacturing method of corrugated cardboard, the manufacturing method comprising:

measuring a moisture of a first surface of a liner by a first sensor arrangement disposed around the liner;

measuring a temperature of the liner by a second sensor arrangement disposed around the liner;

controlling the temperature and moisture of the liner by adjusting an amount of steam directed at the liner, by at least one steam box disposed between a gluing unit and a heating equipment, in response to the measured moisture and the measured temperature of the liner by the first and second sensor arrangements, wherein the moisture of the liner may be decreased or increased by the at least one steam box; and gluing, by the gluing unit, the first surface of the liner and a fluting paper to each other.

15. A process controller adapted to control manufacture of corrugated cardboard, the process controller comprising:

at least one memory storing a computer program code; and at least one processor operatively coupled to the at least one memory, the computer program code stored in the at least one memory and the at least one processor causing the process controller to:

measure a moisture of a first surface of a liner by a first sensor arrangement disposed around the liner, the first surface of the liner being glued to a fluting paper;

measure a temperature of the liner by a second sensor arrangement disposed around the liner; and control the temperature and moisture of the liner by adjusting an amount of steam directed at the liner, by at least one steam box disposed between a gluing unit and a heating equipment, in response to the measured moisture and the measured temperature of the liner by the first and second sensor arrangements, wherein the moisture of the liner may be decreased or increased by the at least one steam box.

* * * * *